United States Patent [19]

Acres et al.

[11] 4,162,235

[45] Jul. 24, 1979

[54] CATALYSTS

[75] Inventors: Gary J. K. Acres; Barry J. Cooper; Brian Harrison, all of London, England

[73] Assignee: Johnson, Matthey & Co., Limited, London, England

[21] Appl. No.: 777,308

[22] Filed: Mar. 14, 1977

[30] Foreign Application Priority Data

Jun. 17, 1976 [GB] United Kingdom ............... 25141/76

[51] Int. Cl.$^2$ ..................... B01J 21/04; B01J 23/10; B01J 23/48; B01J 23/58
[52] U.S. Cl. ..................................... 252/462; 252/457; 252/463; 252/466 PT; 252/473; 252/475; 423/213.5
[58] Field of Search ............... 252/462, 472, 457, 473, 252/475, 463, 466 PT; 423/213.5

[56] References Cited

U.S. PATENT DOCUMENTS

| | | | |
|---|---|---|---|
| 3,895,093 | 7/1975 | Weidenbach et al. | 423/213.5 |
| 3,897,367 | 7/1975 | Lauder | 252/462 |
| 3,905,918 | 9/1975 | Mai et al. | 252/462 |
| 3,919,120 | 11/1975 | Kato et al. | 252/466 B |
| 3,922,204 | 11/1975 | Tseung et al. | 252/462 X |
| 3,926,854 | 12/1975 | Whelan et al. | 252/462 |
| 3,963,827 | 6/1976 | Acres et al. | 423/239 |
| 4,001,143 | 1/1977 | McCann | 252/462 |
| 4,049,583 | 9/1977 | Lauder | 252/462 X |

FOREIGN PATENT DOCUMENTS 662460 12/1951 United Kingdom ................ 423/213.5

*Primary Examiner*—W. J. Shine
*Attorney, Agent, or Firm*—Cushman, Darby & Cushman

[57] ABSTRACT

This invention relates to catalysts, especially for the catalytic oxidation of hydrocarbons and carbon monoxide and for the catalytic reduction of oxides of nitrogen in the presence, respectively, of suitable oxidizing and reducing means.

In more detail, the catalyst of the invention is capable of removing oxygen from a gas containing an excess of oxygen and restoring such removed oxygen to a gas having an oxygen deficiency, and the catalyst comprises at least one of the platinum group metals platinum, rhodium, ruthenium, palladium, indium and osmium and one or more base metals at least one of which has two or more oxidation states.

7 Claims, No Drawings

CATALYSTS

This invention relates to catalysts. More particularly, the invention is concerned with catalysts suitable for the catalytic oxidation of hydrocarbons and carbon monoxide and for the catalytic reduction of oxides of nitrogen in the presence, respectively, of suitable oxidising and reducing means.

The invention is especially concerned with the catalytic purification of the exhaust gases of petrol driven internal combustion engines and of diesel engines but is by no means so limited.

The words "gas" and "gases" in this specification are to be taken as meaning a gas or gases per se, a vapour or vapours or a mixture or mixtures containing one or more gases and one or more vapours.

The components of exhaust gases of the type just referred to may generally for convenience be divided into two groups. The first group contains components which are, or will act as reducing agents and can hence be oxidised and the second, components which are or will act as oxidising agents and can hence be reduced. By "purification" of exhaust gases in this specification is meant the oxidation of at least a proportion of any components of the said first group and the reduction of at least a proportion of any components of the said second group so as to form one or more of at least the products water, carbon dioxide and nitrogen.

Typical members of the first group are carbon monoxide and hydrocarbons formed by the incomplete combustion of fuel in the engine, hydrocarbons in the shape of unburnt but vapourised fuel and hydrogen gas. The principal members of the second group are oxides of nitrogen, often referred to collectively as "NOx", and oxygen.

Ideally the components of the first and second groups are in stoichiometric balance in an exhaust stream so that by passing such an exhaust over a suitable catalyst, the said components may be caused to interact and to effect mutual oxidation and reduction with the formation, for example, of carbon dioxide, water and nitrogen and without leaving any residual unreacted gas or gases.

Such a stoichiometric balance hardly ever occurs in practice, however, except perhaps momentarily, although it could possibly be achieved if means were provided for continuously monitoring the composition of the exhaust and continuously adjusting the ratio of air and fuel being fed to the engine so as to counteract any deviations from exhaust stoichiometry. Possibly means would also be required for introducing, when necessary, additional oxygen into the exhaust gases upstream of the catalyst.

In the absence of means for maintaining stoichiometric balance as just described, the relative proportions of the various components in the exhaust stream from an internal combustion or diesel engine will vary from engine to engine depending upon, among other things, the design of the engine, the actual operating temperature of the engine and its state of tune. In addition, the composition of the exhaust from any given engine will vary during the operation of the engine and will be governed by such factors as the degree of throttle opening. In fact the variation in exhaust composition in practice is such that there are occasions when components of the first (the oxidisable) group preponderate and occasions when those of the second (the reducible) group are in excess.

In general, the variations in exhaust composition just described will correspond to excursions firstly on the "rich" and secondly on the "lean" side of a stoichiometric input mixture of air and fuel to the engine, so that firstly there will be an excess of fuel and secondly an excess of air in the input. This means that a "rich" input mixture will lead to an exhaust stream which is relatively deficient in oxygen and a "lean" mixture which will lead to an exhaust stream containing a relative excess of oxygen.

If a catalyst of the type currently available for the purification of exhaust gases, such as a supported rhodium-platinum catalyst, is used in an exhaust stream for the oxidation of such components as carbon monoxide, hydrocarbons and hydrogen gas and for the reduction of oxides of nitrogen, a relative deficiency of oxygen in the exhaust stream as described above, will reduce the efficiency of the catalytic oxidation process. Conversely, a relative excess of oxygen will militate against the catalytic reduction process. This latter effect in particularly marked with rhodium-platinum catalysts with which NOx reduction seems to be especially easily "poisoned" by an excess of oxygen.

It is an object of this invention to provide catalysts in which the foregoing disadvantages of prior art catalysts are overcome.

According to a first aspect of this invention, a catalyst suitable for catalysing oxidation and reduction processes in a gas (as herein defined) is such that the catalyst is capable of removing oxygen from a gas containing an excess of oxygen and restoring such removed oxygen to a gas in which there is an oxygen deficiency.

Reference herein to "excess" and "deficiency" relates, in general, to an oxidation process which the catalyst is required to catalyse. Accordingly, an "excess" of oxygen means that more oxygen is present in the gas than is required, in conjunction with any other oxidising agents present, to effect the desired oxidation. Conversely, under conditions of oxygen "deficiency" insufficient oxygen will be present to enable the desired oxidation in conjunction with any other oxidising agents present, to be effected.

We have now found that a platinum group metal catalyst in which is incorporated or with which is associated one or more base metals, at least one of which has two or more oxidation states, is suitable for the purposes of this invention.

According to further aspects of the invention, a catalyst suitable for catalysing oxidation and reduction processes in accordance with the first aspect of the invention has the following features taken together or singly:

(a) the catalyst comprises a support or carrier to which is applied and/or which is impregnated with at least one of the platinum group metals platinum, rhodium, ruthenium, palladium, silver, gold, iridium and osmium; at least one of the base metals cobalt, zinc, manganese, nickel, tungsten, cerium, iron, copper, gadolinium, praseodymium, rhenium, chromium, zirconium, molybdenum, lanthanum, tin, calcium, strontium and barium; and, optionally, one or more base metals from the group consisting of the rare earth metals other than praseodymium and lanthanum and those base metals of the first, second and third transition series which are not listed above;

(b) the base metals of the catalyst of feature (a) constitute not less than 5 wt.%, preferably not less than 25 wt.% of the total metal content of the catalyst. By total metal content of the catalyst is meant the total content of base metal and platinum group metals, as defined above, in the catalyst;

(c) the base metals of the catalyst of feature (a) constitute between 30 and 99.9 wt.% and preferably between 70 and 97 wt.% of the total metal content of the catalyst;

(d) the base metals of the catalyst of feature (a) constitute 94 wt.% of the total metal content of the catalyst;

(e) the metals referred to in feature (a) may be in the form of a mixture or alloy;

(f) one or more of the metals referred to in feature (a) may be in the form of the oxide, e.g. copper chromite $CuCrO_4$ (g) two or more of the metals referred to in feature (a) may be in the form of a perovskite; Particularly preferred base metals are cobalt and cerium which may be used separately or together. By a perovskite is meant a mixed oxide system of the form $ABO_3$, where A and B each represent one or more metals such that the A cation is coordinated with 12 oxygen ions and the B cation with 6 oxygen ions. It follows that the A cation will normally be found to be somewhat larger than the B cation. In order for there to be contact between the A,B and O ions, $R_A+R_O$ should be equal to $\sqrt{2}(R_B+R_O)$ where $R_A$, $R_B$ and $R_O$ are the ionic radii. In practice, A may represent one or more rare earth metals and B may represent one or more metals of the first, second and third transition series of the Periodic Table.

(h) the support or carrier of feature (a) may compromise one or more refractory oxides and is preferably applied as a continuous or discontinuous film, coating, layer or deposit on a substrate;

(i) the substrate of feature (h) may be of ceramic material or metal and is preferably in the form of an inert, rigid honeycomb structure to the surface of the channels or passageways of which the support or carrier is applied. Suitable alloys from which a metallic substrate may be formed are chromium, aluminium, cobalt alloys, such as KANTHAL (Registered Trade Mark) alloys and an iron chromium, aluminium, yttrium aloy known as a FECRALLOY (Registered Trade Mark) alloy. This latter alloy is described and claimed in British Pat. No. 1,045,993;

(j) the support or carrier of feature (h) is preferably selected from the group consisting of oxides of aluminium, magnesium, calcium, strontium, barium, scandium, yttrium, the lanthanides, gallium, indium, thallium, silicon, titanium, zirconium, hafnium, thorium, germanium, tin, lead, vanadium, niobium, tantalum, chromium, molybdenum, tungsten and rhenium;

(k) the support or carrier of feature (a) may be applied to the substrate of features (h) or (i) by dipping the substrate into a suspension or dispersion of the support or carrier material or other medium containing the support or carrier material and having appropriate rheological properties, and then calcining the so-treated substrate. Alternatively, the suspension or dispersion may be poured over the substrate prior to calcination. In both cases, when a honeycomb substrate is used in accordance with feature (i), the surplus suspension or dispersion may be removed by draining and/or blowing with compressed air before the substrate is calcined.

(l) the support or carrier of feature (a) includes aluminium oxide and the oxide of at least one other of the metals listed in feature (j), such as lanthanum oxide and/or barium oxide so as to improve the surface area stability of the support or carrier at high temperature;

(m) preferably one of the "other" metals referred to in feature (l) which will improve the high temperature stability of the support or carrier is the, or one of the base metals included in the catalyst of feature (a).

One way of preparing a catalyst according to the invention is as follows:

1. An alumina suspension suitable for the "coating" of a ceramic, honeycomb monolith with a layer of alumina which, on firing, will constitute the support or carrier previously referred to, is prepared by slurrying sufficient alumina monohydrate with water so that the slurry contains 40–46 wt,% of solids, following which the pH of the slurry is adjusted to 3.5 of the addition of nitric acid. A ceramic honeycomb substrate is dipped into the slurry, allowed to drain so that the passageways of the honeycomb become clear and fired at 550° C. for 30 minutes.

2. The fired "washcoated" monolith is next immersed in an aqueous solution of barium nitrate, dried and then fired at 550° C. for 30 minutes. The concentration of barium nitrate in the solution is such that, after immersion and firing, the alumina coating will contain 5 wt.% of barium.

3. The process of stage 2 above is repeated except that the solution contains, in place of the barium nitrate, the nitrate of one or more of the base metals listed in feature (a) of the invention except that, in the case of tungsten, ammonium metatungstate is used. The quantity of the base metal salt in solution is defined in stage 4 below.

4. The process of stage 3 above is repeated except that the solution contains platinum tetrammine chloride, $Pt(NH_3)_4Cl_2$, and Claus' salt $[Rh(NH_3)_5Cl]Cl_2$ and the ceramic monolith is fired at 650° C. for 30 minutes. The relative quantities of the platinum and rhodium salts are such as correspond to a ratio of platinum of rhodium of 10 to 1; the total quantity of platinum and rhodium salts is such as to give a precious metal concentration in the washcoated and fired monolith of 40 grams per cubic foot of the so-treated monolith and the quantity of base metal salt used in stage 3 is such that the amount of this base metal in the washcoated and fired monolith is 87 wt.% of the total metal content. The above produces a catalyst according to the invention in which the washcoat which constitutes the support or carrier is "stabilised" with barium.

Base metals incorporated in the catalyst in stage 3 above which have been found to be especially suitable for the purposes of the invention are cobalt, cerium, chromium, manganese, nickel and praseodymium and our experiments have shown that the optimum quantity of base metal is about 150 grams per cubic foot of washcoated and fired monolith. In a modification of this process, stages 3 and 4 may be combined so that the base metal nitrate(s) and platinum group metal compounds are applied to the washcoated monolith from a mixture of the solutions used for stages 3 and 4. In this case, the monolith after immersion and drying is fired at 650° C. for 30 minutes.

In an alternative way of preparing a catalyst, lanthanum nitrate is used in place of the barium nitrate, the quantity of lanthanum nitrate present being sufficient to introduce 5 wt.% of barium into the fired washcoat. The process just described produces a catalyst in which the washcoat is stabilized with lanthanum.

Yet another way of preparing a catalyst in accordance with the invention in which three of the base metals such as lanthanum, strontium and cobalt for example, or lanthanum, barium and cobalt are in the form of a perovskite, such as $La_{0.8}Sr_{0.2}CoO_3$, $La_{0.8}Sr_{0.2}Co_{0.98}Rh_{0.013}O_3$ or $La_{0.8}Ba_{0.2}CoO_3$ (see feature (g) above), comprises the following stages:

(i) the nitrates of the respective metals are first dissolved in water in the correct proportions following which the metals are precipitated as the carbonates by treatment with a solution of potassium carbonate;

(ii) the carbonates are filtered, dried and fired at 1000° C. for 12 hours to form the required perovskite;

(iii) the perovskite material formed in (ii) and alumina as used in stage 1 (above) are slurried in water in the proportions by weight of 1 to 5, following which the monolith is coated with the slurry, dried and fired at 550° C. for 30 minutes;

(iv) the washcoated and fired monolith prepared in (iii) is dipped into a solution containing barium nitrate, platinum tetrammine chloride and Claus' salt and then dried and fired at 650° C. for 30 minutes.

In yet further ways of preparing catalysts in accordance with the invention:

(a) rhodium nitrate is included with the other nitrates in stage (i) above so that on completion of stages (i) and (ii) a perovskite of the form $La_{0.8}Ba_{0.2}Co_{0.987}Rh_{0.013}O_3$ is formed in place of one of the perovskites previously mentioned. Thereafter stages (iii) and (iv) may be carried out as described above. When rhodium is present in the perovskite it is not strictly necessary for it to be added as one of the catalyst metals in stage (iv). Accordingly, Claus' salt may be omitted from the stage (iv) solution; and (b) in place of the materials used to form a perovskite as in stage (i) above there are used materials which will form barium mesoperrhenate, $Ba_3(ReO_5)_2$. This substance is conveniently made by mixing together solutions of ammonium perrhenate and barium hydroxide in a molar ratio of 2:1 respectively and then boiling the solution to drive off the ammonia and allowing the liquid to cool whereupon crystals of barium perrhenate are formed. Following this the crystals are removed, washed and then dried at about 100° C. The formation of the perrhenate is represented by the equation $2NH_4ReO_4 + Ba(OH)_2 \cdot 8H_2O = Ba(ReO_4)_2 + 2NH_3 + 10H_2O$. Next the white crystalline perrhenate is ground up with barium carbonate in a molar ratio of 1:2 respectively and the mixture fired in a closed platinum crucible for 2 hours at 700° C. and then for 2 hours at 850° C. to form the bright yellow mesoperrhenate as follows:

$$Ba(ReO)_4)_2 + 2BaCO_3 = Ba_3(ReO_5)_2 + 2CO_2$$

Finally stages (iii) and (iv) are carried out as described above excpet that the first line of section (iii) "the perovskite material formed in (ii)" should be replaced by "the barium mesoperrhenate formed as just described".

We have found that catalysts according to the invention have particularly good oxygen removal and restoration properties as defined in the statement of the first aspect of this invention when the metal, the oxide of which is added to aluminium oxide to form the support or carrier in accordance with feature (1) of the "further aspects" of the invention, is also the base metal or one of the base metals of the catalyst as specified in feature (a). Thus when the support or carrier is stabilised with barium oxide, particularly good results have been obtained when the catalyst layer includes the barium oxide-containing perovskite $La_{0.8}Ba_{0.2}CoO_3$.

What we claim is:

1. A catalyst suitable for catalysing oxidation and reduction processes in a gas and capable or removing oxygen from a gas containing an excess of oxygen and restoring at least a part of such removed oxygen to a gas having an oxygen deficiency, the catalyst comprising a support carrying at least one precious metal selected from platinum, gold, silver, rhodium, ruthenium, palladium, iridium and osmium and a perovskite selected from the group consisting of:

$La_{0.8}Sr_{0.2}CoO_3$,
$La_{0.8}Ba_{0.2}CoO_3$,
$La_{0.8}Ba_{0.2}Co_{0.987}Rh_{0.013}O_3$ or
$La_{0.8}Sr_{0.2}Co_{0.98}Rh_{0.013}O_3$ the support being stabilized by the inclusion therein of lanthanum oxide or barium oxide.

2. A catalyst according to claim 1 wherein the catalyst support is a substrate made from a material selected from the group consisting of ceramic materials and metals.

3. A catalyst according to claim 2 wherein the substrate is in the form of an inert, rigid honeycomb structure having a plurality of channels with the catalyst applied to the surfaces of the channels.

4. A catalyst according to claim 2 including an intermediate support layer between the substrate and the catalyst metal, wherein the support layer is made from a material selected from the group consisting of oxides of aluminium, magnesium, calcium, strontium, barium, scandium, yttrium, the lanthanides, gallium, indium, thallium, silicon, titanium, zirconium, hafnium, thorium, germanium, tin, lead, vanadium, niobium, tantalum, chromium, molybdenum, tungsten and rhenium.

5. A catalyst suitable for catalysing oxidation and reduction processes in a gas and capable of removing oxygen from a gas containing an excess of oxygen and restoring at least a part of such removed oxygen to a gas having an oxygen deficiency, the catalyst comprising a support carrying at least one precious metal selected from platinum, gold, silver, rhodium, ruthenium, palladium, iridium and osmium; and barium and rhenium in the form of barium mesoperrhenate.

6. A catalyst suitable for catalysing oxidation and reduction processes in a gas and capable of removing oxygen from a gas containing an excess of oxygen and restoring at least a part of such removed oxygen to a gas having an oxygen deficiency, the catalyst comprising a support stabilized by barium oxide and carrying a catatytic layer consisting essentially of at least one precious metal selected from platinum, gold, silver, rhodium, ruthenium, palladium, iridium and osmium; and a barium oxide-containing perovskite which has the formula $La_{0.8}Ba_{0.2}CoO_3$.

7. A catalyst according to claim 6 wherein the support comprises alumina stabilized with barium oxide.

* * * * *